(12) United States Patent
Song et al.

(10) Patent No.: US 7,730,199 B2
(45) Date of Patent: Jun. 1, 2010

(54) METHOD AND SYSTEM OF PROCESSING A DATA STREAM

(75) Inventors: June-Hwa Song, Daejeon (KR); Seung-Woo Kang, Daejeon (KR); Young-Ki Lee, Daejeon (KR); Sung-Hwan Ihm, Daejeon (KR); Soun-Eil Park, Daejeon (KR); Jae-Sun Han, Daejeon (KR); Su-Myeon Kim, Yongin-si (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 460 days.

(21) Appl. No.: 11/734,399

(22) Filed: Apr. 12, 2007

(65) Prior Publication Data

US 2007/0288649 A1 Dec. 13, 2007

(30) Foreign Application Priority Data

May 11, 2006 (KR) .................. 10-2006-0042343

(51) Int. Cl.
*G06F 15/16* (2006.01)
*G06F 3/00* (2006.01)
*G06F 9/45* (2006.01)
*G06F 9/44* (2006.01)

(52) U.S. Cl. .................. 709/231; 709/230; 710/52; 717/153; 719/331

(58) Field of Classification Search .............. 709/230, 709/231; 710/52; 717/153; 719/331
See application file for complete search history.

(56) References Cited

U.S. PATENT DOCUMENTS

| 2002/0161907 | A1* | 10/2002 | Moon | ................. 709/230 |
| 2003/0028451 | A1* | 2/2003 | Ananian | ................. 705/27 |
| 2003/0229900 | A1* | 12/2003 | Reisman | ................. 725/87 |
| 2004/0254842 | A1* | 12/2004 | Kirkegaard | ................. 705/22 |
| 2005/0140694 | A1* | 6/2005 | Subramanian et al. | ...... 345/619 |
| 2005/0182843 | A1* | 8/2005 | Reistad et al. | .............. 709/230 |

\* cited by examiner

*Primary Examiner*—Ranodhi N Serrao
(74) *Attorney, Agent, or Firm*—Daly, Crowley, Mofford & Durkee, LLP

(57) ABSTRACT

Methods and systems of processing a data stream are disclosed. A developer may develop a service only by programming a Service Unit (SU) including a service logic (SL) and including a Service Unit Description Language (SUDL) file, so that the developer may not need to program complicated stream processing code, such as stream source connection code, network input/output (I/O) code, and buffering code. In addition, the stream source connected dynamically to the service and a service execution mode (such as push and pull modes) may be converted by simply changing setting files based on the service model. The system includes modules for managing and processing the stream in reality, such as stream source connection modules, network I/O processing modules, and stream buffering modules, the modules operating the developed program through the service model.

15 Claims, 6 Drawing Sheets

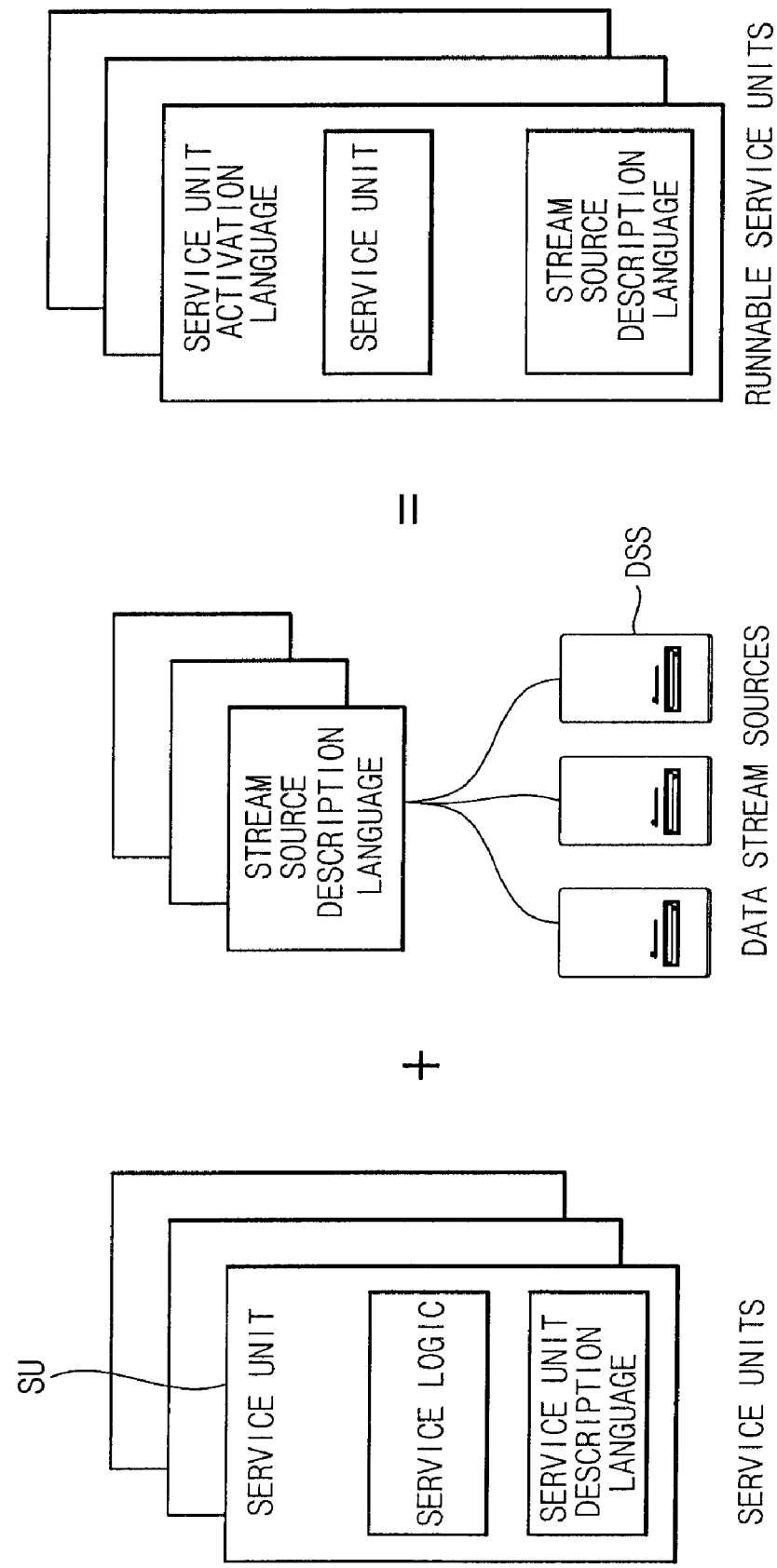

FIG. 2

```
public abstract interface ServiceLogic {

// constants
        public static final int BUFSEM_1 = 0x00000001;
        public static final int BUFSEM_2 = 0x00000002;
        public static final int BUFSEM_3 = 0x00000003;

// functions related to service execution
        public abstract boolean init();
        public abstract boolean uninit();
        public abstract Object process(Object[] userParam);

// functions related to data handling
        public abstract Object getBufferSemantic();
        public abstract boolean tupleHandler(Object[] tuple);

```xml
<?xml version="1.0"?>
<serviceUnit>
    <name>Shortest Path Service</name>
    <description>......</description>
    <inputSchema>
        <name>input1</name>
        <description>......</description>
        <element name="id" type="int"/>
        <element name="time" type="time"/>
        <element name="averageSpeed" type="int"/>
    </inputSchema>
    <inputSchema>
        <name>input2</name>
        ......
    </inputSchema>
    <outputSchema>
        <description>......</description>
        <element name="id" type="int"/>
        <element name="time" type="time"/>
        <element name="averageSpeed" type="int"/>
    </outputSchema>
    <userParameter>
        <description>......</description>
        <element name="startPoint" type="string"/>
        <element name="endPoint" type="string"/>
    </userParameter>
    ......
</serviceUnit>
```

FIG. 4

```xml
<?xml version="1.0"?>
<streamSource>
        <name>Traffic Information</name>
        <description>......</description>
        <location>192.168.0.1:1234</location>
        <schema>
                <name>roadTraffic</name>
                <description>......</description>
                <element name="roadID" type="int"/>
                <element name="avgSpeed" type="int"/>
                <element name="timeStamp" type="time"/>
        </schema>
        <schema>
                <name>carTraffic</name>
                ......
        </schema>
</streamSource>
```

FIG. 5

```xml
<?xml version="1.0"?>
<runnableServiceUnit>
        <name>Activated Shortest Path Service</name>
        <description>......</description>
        <serviceUnit name="sps" location="./shortestPathService.jar"/>
        <dataStreamSource>
                <source name="s1" location="http://192.168.0.1/avgRoadSpd.ssdl"/>
                <source name="s2" location="......"/>
        </dataStreamSource>
        <binding target="sps.input1" query="select roadID, timeStamp, avgSpeed from s1.roadTraffic"/>
        <binding target="sps.input2" query="......"/>
        <executionMode type="push"/>
</runnableServiceUnit>
``` ns# METHOD AND SYSTEM OF PROCESSING A DATA STREAM

CROSS-REFERENCE TO RELATED APPLICATIONS

This application claims priority under 35 USC §119 to Korean Patent Application No. 2006-42343, filed on May 11, 2006 in the Korean Intellectual Property Office (KIPO), the disclosure of which is incorporated herein in its entirety by reference.

BACKGROUND OF THE INVENTION

1. Field of the Invention

The present invention relates to a middleware system facilitating development, deployment and provision of a stream-based service, and more particularly to methods and systems of processing a data stream (DS) which is large in quantity and continuously updated, such as radio frequency identification (RFID) or a ubiquitous sensor network (USN).

2. Description of the Related Art

A ubiquitous service is a service in which a computing environment actively provides a service conforming to a situation by monitoring user environment information, compared with a traditional service in which a computing environment passively provides a service upon receiving a user request. Nowadays, various sensors such as RFID sensors, which are required for ubiquitous services, are deployed in various places for monitoring user environment information. The sensors provide data to the computing environment by periodically monitoring the environment information. Here, the data received in the computing environment is referred to as a data stream (DS) because the data is large in quantity and is periodically updated.

Service platforms currently developed and frequently used include Web services, Java Platform, Enterprise Edition (Java EE) (formerly J2EE), Open Services Gateway initiative (OSGi), etc. The service platforms provide a component-based standardized computing environment for a distributed service. However, the service platforms do not consider a DS generated in a ubiquitous environment as input data. The service platforms provide a service by processing the data based on a method of reading and writing the data mainly in static data storage. Therefore, this method has a problem in terms of performance in reading and writing the DS, which is large in quantity and continuously updated.

A stream processing engine proposed for DS processing supports a new query model based on the Structured Query Language (SQL) related to DSs and supports efficient data processing only for a limited DS operation, such as a selection function or an aggregation function. However, the stream-processing engine has limitations in terms of allowing development and operation of a service logic (SL) that is more general and complicated.

Most useful high value-added services are being written in a program language other than SQL, for example, a service that searches for an ideal path in real time based on route information that is updated in real time. Here, Dijkstra's algorithm is mostly used for searching for the ideal path, but it is difficult to express Dijkstra's algorithm in SQL. Accordingly, a new system is needed to support the development and provision of a service that is more general and complicated.

RFID middleware is hardware and/or software that collects a large quantity of raw data generated in a heterogeneous environment, filters the data, summarizes the data into meaningful information, and provides the meaningful information to an application service. Various types of RFID middleware have been proposed, such as Savant Specification published by the Auto-ID Center in September 2003, the Application Level Event (ALE) specification published by EPC global Inc. in October 2004, etc. In addition, Sun, Oracle, IBM, Microsoft, ConnecTerra, Globe Ranger, etc., are developing middleware systems.

These types of RFID middleware limit input data provided from an RFID reader and focus on reducing amounts of overlapping data by correcting data that has a lot of errors, and by simple operations such as filtering, counting, aggregation, etc.

Accordingly, middleware development is needed for integrating and transmitting not only simple DSs read from RFID tags, but also DSs in other environments such as USNs, mobile applications, etc.

SUMMARY OF THE INVENTION

Accordingly, the present invention is provided to substantially obviate one or more problems due to limitations and disadvantages of the related art.

Some embodiments of the present invention provide a system and a method of processing a data stream (DS) to solve problems related with existing technology, and to allow easy development and operation of various types of generic services based on a DS as an input.

Some embodiments of the present invention provide a system and a method of processing a DS capable of supporting development of a service logic (SL) by providing a programming model in which the SL and a stream processing part are divided, so that a service developer can develop the logic without having to concentrate on DS processing. The programming model helps to convert a service based on static data to a service based on DSs with almost no modifications to the SL.

Some embodiments of the present invention provide a runtime environment to support easy deployment and operation of a developed program. In order to provide such flexible support, efficient DS processing logic and efficient DS managing logic, and components helping to deploy and to execute the service efficiently have to be designed, and the runtime environment has to be composed by combining the logics and the components.

Some embodiments of the present invention provide a system and a method of processing a DS capable of supporting a push mode service and a pull mode service. The push mode service and the pull mode service are based on a stream-based service feature, and thus a service execution method may be automatically converted according to a user request. For example, in the case of the push mode service, a shortest path is updated in real time to a user while a stream-based shortest path service is executed, and in the case of the pull mode service, the shortest path is provided to the user only by a user request. Therefore, based on the flexible support, services of different execution modes may be provided.

Some embodiments of the present invention provide a system and a method of processing a DS in which a data stream as an input may be easily replaced with a new data stream without modification of the program when a better new DS becomes available as the input, because the DS may be converted by modifying setting files.

In some embodiments of the present invention, a method of processing a DS includes selecting a Stream Source Description Language (SSDL) file and a Service Unit (SU), the SSDL file and the SU being assigned by a Service Unit Activation Language (SUAL) file, transmitting a query written by the selected SUAL file to a corresponding stream provider based on a stream provider address written by the selected SSDL file, preparing a buffer based on schema information about a result of the transmitted query, generating an instance of the selected SU, initializing the selected SU into an execution mode assigned by the SUAL file, updating, in real time, data stored in the prepared buffer by using the DS provided by the stream provider, and processing the data stored in the buffer according to the execution mode in response to a user request to provide a result of the user request to a user.

In some embodiments, the SU includes an SL and a Service Unit Description Language (SUDL) file, the SL and SUDL file being developed by a service developer.

In some embodiments, the SL includes an initialization function, a process function, an uninitialization function, a buffer semantic function, and a tuple handler function.

In some embodiments, the SUDL file includes a service name, an input data schema, an output data schema, and a transmission element.

In some embodiments, the buffer includes a first buffer for buffering recent N pieces of data, a second buffer for buffering one piece of data per data key, and a third buffer for buffering recent N pieces of data per data key.

In some embodiments, the execution mode includes a push mode and a pull mode.

In some embodiments, the requested data updated in real time is repeatedly provided to the user when the execution mode corresponds to the push mode.

In some embodiments, the requested data is provided only by the user request when the execution mode corresponds to the pull mode.

In some embodiments, the SSDL file includes a service name, a location and a DS schema.

In some embodiments of the present invention, an output circuit of a semiconductor memory device includes a first data path, a second data path and a third data path.

A service deployer (SD) module registers an SU developed by a service developer and an SUAL file written by a service provider, and generates a query, a query result schema and execution mode information, the query result schema and the execution mode information being assigned by the registered SUAL file.

The stream handler (SH) module transmits the query from the SD module to a stream provider and updates, in real time, data stored in a buffer in response to the query result schema by using the DS provided by the stream provider.

The service operator (SO) module receives a user request, processes the data stored in the buffer by executing a service unit instance (SUI) in response to the user request according to the execution mode information from the SD module, and provides a result of the user request to a user.

In some embodiments, the SD module includes a service unit registry (SUR) that stores the SU, a service unit handler (SUH) that performs registration of the SU on the SUR and processes the SUAL file written by the service provider, and a service unit activator (SUA) that generates the query, the query result schema, and the execution mode information, the SUAL file being provided by the SUH.

In some embodiments, the SUA manages a query list, merges an input query into an existing query when the result of the input query and the result of the existing query are identical to each other, and provides a new query to the stream provider requesting a partial result of the input query when the result of the input query and the result of the existing query are partially overlapped.

In some embodiments of the present invention, the SH module includes a data stream receiver (DSR) and a buffer manager (BM).

The DSR transmits the query from the SD module to the stream provider and receives the DS from the stream provider in response to the query.

The BM assigns a buffer in memory in response to the query result schema provided by the SD module, assigns the buffer to the corresponding query, stores data in the assigned buffer using the DS provided by the DSR, and provides the data to the SO module according to an execution mode.

In some embodiments, the BM converts the DS to data conforming to an input data schema of an SL and provides the converted data to the SO module.

In some embodiments, the SO module includes a user request handler (URH), a scheduler, a service unit instance manager (SUIM), and a runtime monitor (RM).

The URH registers the user request and transmits the result of the user request to the user.

The scheduler controls a process schedule of the user request registered in the URH in response to a resource usage state.

The SUIM processes the user request by executing the SUI by processing the SUI in response to the process schedule from the scheduler according to the execution mode and provides the result of the user request to the URH.

The RM monitors the resource usage state of each component and the SUI that is currently being executed, and provides the resource usage state to the scheduler.

In some embodiments, the SUIM generates one SUI per user request and the generated SUI becomes extinct after a requested time duration when the execution mode corresponds to the push mode.

In some embodiments, the SUIM selects one SUI out of an instance pool to process the user request and returns the selected SUI into the instance pool when the execution mode corresponds to the pull mode.

In some embodiments of the present invention, a computer-readable storage medium storing a program performs a method of processing a DS. The method includes selecting an SSDL file and the SU, the SSDL file and the SU being assigned by an SUAL file, transmitting a query written by the selected SUAL file to a corresponding stream provider based on a stream provider address written by the selected SSDL file, preparing a buffer according to schema information about a result of the transmitted query, generating an instance of the selected SU, initializing the selected SU into an execution mode assigned by the SUAL file, updating, in real time, data stored in the prepared buffer by using the DS provided by the stream provider, and processing the data stored in the buffer based on the execution mode in response to a user request to provide a result of the user request to a user.

In some embodiments of the present invention, a method of processing a DS includes receiving a user request, assigning a service unit instance (SUI) corresponding to the received user request by selecting the SUI based on scheduling, executing the assigned SUI to process data in response to a query of a service, the data being updated in real time using the DS from a stream provider, and providing a result of the user request to a user, the result being provided by the assigned SUI.

BRIEF DESCRIPTION OF THE DRAWINGS

FIG. 1 is a diagram illustrating a concept of a service model according to an example embodiment of the present invention.

FIG. 2 illustrates an example of a service logic interface (SLI) file according to an example embodiment of the present invention.

FIG. 3 illustrates an example of a Service Unit Description Language (SUDL) file according to an example embodiment of the present invention.

FIG. 4 illustrates an example of a Stream Source Description Language (SSDL) file according to an example embodiment of the present invention.

FIG. 5 illustrates an example of a Service Unit Activation Language (SUAL) file according to an example embodiment of the present invention.

DESCRIPTION OF THE EMBODIMENTS

Figure 6:
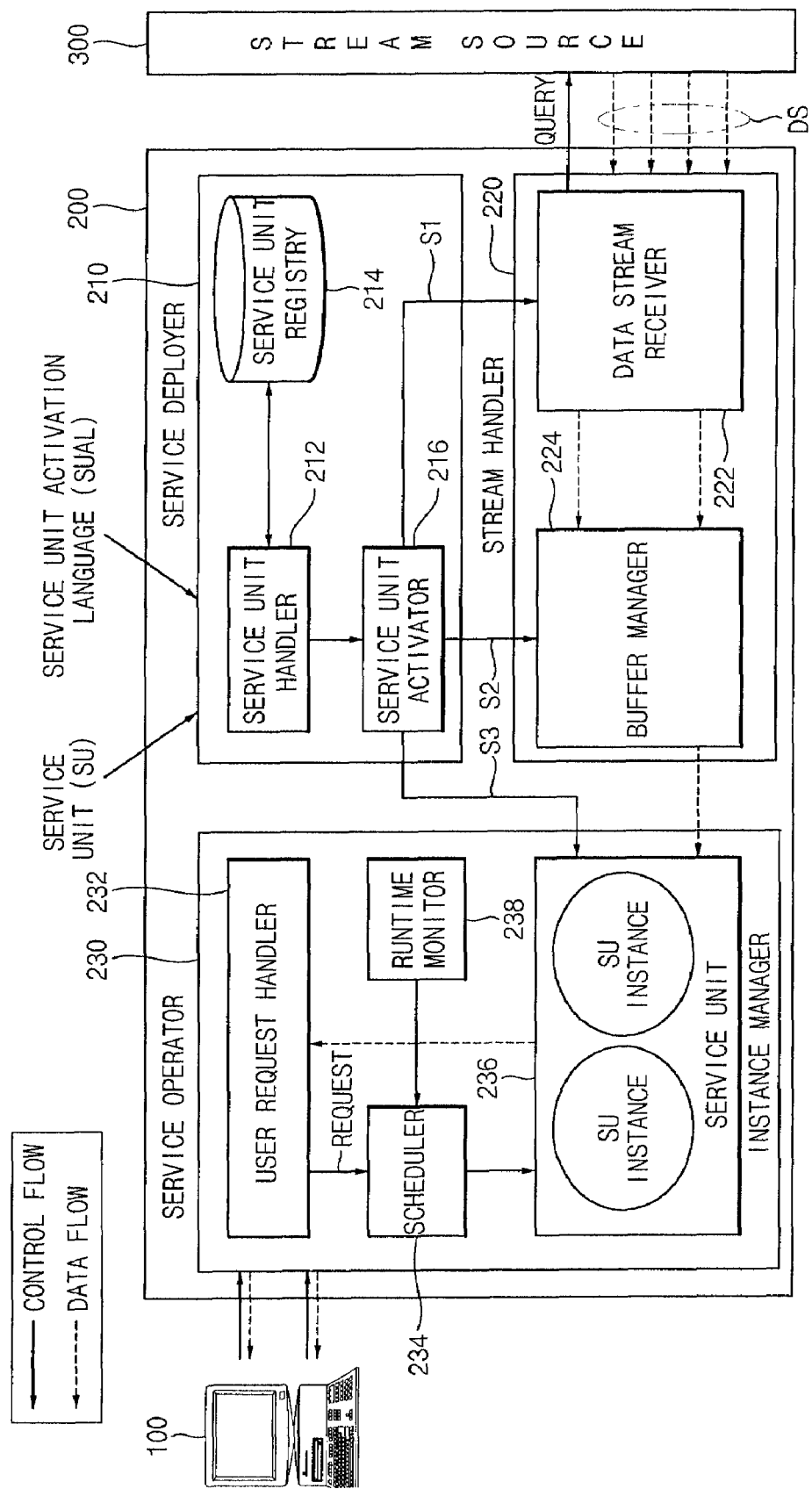
FIG. 6 is a block diagram illustrating a data stream processing system according to an example embodiment of the present invention.

Embodiments of the present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly SO defined herein.

FIG. 1 is a diagram illustrating a concept of a service model according to an example embodiment of the present invention.

The service model of the present invention is designed to increase reuse of a service. A service logic (SL) developer may develop an SL irrespective of a data stream source (DSS) and of an execution method. In addition, the developed SL may be executed based on a simple setting by combining the developed SL and a data stream (DS) provider without being compiled. Accordingly, the developed SL may be connected to any kind of the DSS providing necessary information, and the DSSs may include a radio frequency identification (RFID) reader, a ubiquitous sensor network (USN) reader, a home application, the Internet, etc.

The service model includes service units (SUs), the DSSs, and runnable service units (RSUs) for performing this function.

A development process using the service model according to the present invention is as follows.

The service developer develops the SL, writes a Service Unit Description Language (SUDL) file illustrating a function of the SL, and creates the SU including the SL and the SUDL file. In addition, the DSS writes a Stream Source Description Language (SSDL) file describing a DS provided by the DSS. A connection between the SU and the DSS is not defined and not implemented while the SU is developed, and determined when the SU is executed, so that the SU may be easily reused.

An execution process of the developed SU is as follows. A service provider actually executing the service indicates the SSDL file, which has information about the desired SU to be executed and about the DSS to be used, writes a Service Unit Activation Language (SUAL) file, which has an execution transmission parameter, and runs the service.

A runtime connects the DSS to the SU, the connection being based on described information in the SUAL file, and executes the service corresponding to the execution transmission parameter.

Hereinafter, a development process of the SL will be explained with reference to a diagram.

FIG. 2 illustrates an example of a service logic interface (SLI) file according to an example embodiment of the present invention.

A service developer produces an SL by implementing the SLI file of FIG. 2. Five functions are assigned for execution in the SLI file. The five functions are divided into two parts, of which three functions are for service execution and two functions are for data stream (DS) processing. For the execution of the service, an init( ) function performs tasks needed for initialization of variable values and for assigning of resources when the execution starts, a process( ) function executes the SL calculating a result, and an uninit( ) function releases the resources and executes tasks required for termination of the service when the service is terminated.

A getBufferSemantic( ) function provides information based on a type of a buffer that is to be used in the SL to a runtime. The runtime obtains information about the type and size of the buffer based on a return value of the getBufferSemantic( ) function. A service model of the present invention provides three types of buffers. A first buffer buffers recent N pieces of data, a second buffer buffers one piece of data per data key, and a third buffer buffers recent N pieces of data per data key.

A tupleHandler( ) function converts data of a buffer into converted data conforming to a data structure (such as trees or lists) used by the process( ) function.

The runtime process of the present invention performs the service as follows based on the five functions implemented by a developer.

First, the init( ) function is called to initialize the service and the getBufferSemantic( ) function is called to prepare the buffer conforming to one of the three types of the buffers. In addition, the tupleHandler( ) function and the process( ) function are called according to an execution mode (such as pull or push modes) when the service starts the execution. The tupleHandler( ) function updates the data just after the data arrives, and the process( ) function causes the converted data to be calculated when the execution mode is the push mode. The tupleHandler( ) function and the process( ) function are called based on the stored data in the buffer in response to a user request when the execution mode is the pull mode. The uninit( ) function is called to terminate the service when the service is terminated.

Hereinafter, an SUDL file, which is a component of an SU, an SSDL file, and an SUAL file, which are necessary for execution of a service, will be explained with reference to a diagram.

FIG. 3 illustrates an example of an SUDL file according to an example embodiment of the present invention.

The SUDL file is an extensible markup language (XML) file describing the SU. The XML file includes information about a service name, an input data schema, an output data schema, a transmission parameter provided from a service user, and other information related to the SU. The input data schema is a DS schema needed for an SL input. The output schema is a result schema that is included in a calculated result by an SL. A service provider refers to the SUDL file when the SU is performed, as the Web Services Description Language (WSDL) is referred to when a Web service is performed.

FIG. 4 illustrates an example of an SSDL file according to an example embodiment of the present invention.

The SSDL file describes DSS information. The SSDL file has a provider name, a location, and a provided DS schema. The SSDL file may be stored in universal storage or in integrated storage, such as the Universal Description, Discovery and Integration (UDDI) specification. In addition, a service developer and a service provider may obtain the DS information by gaining access to the storage and by searching for the SSDL file.

FIG. 5 illustrates an example of an SUAL file according to an example embodiment of the present invention.

The SUAL file is an XML file combining a service unit (SU) and an SSDL file that are needed for executing a service. The SUAL file includes the SU to be executed, the SSDL file of a DSS to be used, a query to be provided to the DSS, and a service execution mode. A query result schema should be identical to an input data schema of the SU because the SU receives an input DS through the query. This principle is identical to a principle of which a transmission parameter should be indicated in proper order when a function is called in a program. The service execution mode represents what type of service may be executed, that is, a push mode or a pull mode. A runtime causes the service to be executed by converting a service mode to another service mode according to a simple setting.

FIG. 6 is a block diagram illustrating a DS processing system according to an example embodiment of the present invention.

Referring to FIG. 6, a DS processing system 200 is deployed between a service user 100 and a stream provider 300. The DS processing system 200 buffers a DS provided in real time by the stream provider in response to a user request, and provides a result of the user request to the user by processing a requested SL.

The service user 100 may be connected to the DS processing system 200 through a mobile terminal such as a mobile phone, or a terminal of a personal computer or a notebook computer, in a network such as a mobile communication network, the Internet, a wired communication network, and the like.

The stream provider 300 may include an RFID reader, a USN reader, a home application, etc., and provides user environment information or request information to the DS processing system 200 by selecting in real time the user environment information or the request information.

The DS processing system 200 may include a service deployer (SD) module 210, a stream handler (SH) module 220, and a service operator (SO) module 230.

The SD module 210 includes a service unit handler (SUH) 212, a service unit registry (SUR) 214, and a service unit activator (SUA) 216.

The SUH 212 performs registering of a developed SU. The SUH 212 stores the SU on the SUR 214 based on the SU from a service developer and manages a registered service list. In addition, the SUH 212 receives an SUAL file and provides the SUAL file to the SUA 216.

The SUR 214 stores the SU provided by the SUH 212.

The SUA 216 activates the SU described in the SUAL file. In other words, the SUA 216 reads a uniform resource identifier (URI) of an SSDL file, and a query, which are described in the SUAL file. The SUA 216 provides a stream provider 300 address, a query S1, and query result schema information S2 to the SH module. In addition, the SUA causes the SO module 230 to generate a service unit instance (SUI) of the corresponding SU by providing a signal S3.

In addition, the SUA 216 performs a function of merging an input query into an existing query when an input query result is overlapped with an existing query result to reduce network input/output traffic and memory consumption. The SUA 216 manages a query list, merges the input query into the existing query when the input query result and the existing query result are identical to each other, and accordingly, a system does not request the query from the stream provider. In addition, the SUA 216 provides a new query to the stream provider requesting a partial result of the input query when the result of the input query and the result of the existing query are partially overlapped.

The SH module 220 includes a data stream receiver (DSR) 222 and a buffer manager (BM) 224.

The DSR 222 receives the DS from the stream provider 300. The DSR 222 generates a connection between the DSR and the stream provider 300, and transmits the query S1 from the SUA 216 to the stream provider 300 by receiving the stream provider address. In addition, the DSR 222 transmits the DS from the stream provider 300 to the BM 224 based on a result of the query.

The BM 224 assigns and manages a buffer related to the DS stored in the DSR 222. The BM 224 assigns the buffer in memory in accordance to the query result schema information S2 provided from the SUA 216. In addition, the BM 224 stores the DS received from the DSR 222 in the assigned buffer to the corresponding query. In case of a push mode service, data stored in the buffer is transmitted to the SUI in real time. In case of a pull mode service, the data stored in the buffer is transmitted to the SUI only by the user request. The BM 224 converts the DS to data conforming to an input data schema of the SL when the converted data are finally transmitted to the SUI.

The SO module 230 includes a user request handler (URH) 232, a scheduler 234, a service unit instance manager (SUIM) 236, and a runtime monitor (RM) 238.

The SUIM 236 manages and executes the SUI. In case of the push mode service, the SUIM 236 generates one SUI per user request. The generated SUI is preserved during a requested time duration and becomes extinct after a requested time duration. In case of the pull mode service, the SUIM 236 generates a predetermined number of the SUIs, manages the SUIs in an instance pool, selects one SUI out of the instance pool, and processes the user request, in which the select of the SUI is performed when the user requests the service. The used SUI is returned into the instance pool after a result of the user request is generated by the SL that is executed by the SUI and the result is transmitted.

The URH 232 receives the user request from the user 100, transmits the user request to the scheduler 234, and transmits the result of the user request to the user 100. In case of the push mode service, the URH 232 preserves request-related information such as the request duration and conditions for transmitting the result of the request, and transmits the result to the user during the request duration. The result of the request may be transmitted periodically or may be transmitted whenever the result is generated.

The scheduler 234 controls a processing schedule of the user request. To control the processing scheduler, the scheduler 234 refers to a resource usage state monitored by the RM 238 and causes the SUI to execute to obtain a corresponding result by controlling the SUIM 236.

The RM 238 monitors the resource usage state of each component and the SUI that is currently executing, and provides the resource usage state to the scheduler 234.

The SUH 212 receives the SU or the SUAL file from the service developer. The SUH 212 stores the SU on the SUR 214 when the SUH 212 receives the SU. On the other hand, when the SUH 212 receives the SUAL file, the SUH 212 searches for an SU name from the SUR, where the SU name is described in the SUAL file, and transmits the searched SU and the SUAL file to the SUA 216.

The SUA 216 starts executing the SU through the SH module 220 and the SUIM 236. The SUA 216 transmits the query result schema information S2 to the BM 224 by analyzing the query of the SUAL file. The BM 224 assigns the buffer in the memory based on the query result schema information S2. In addition, the SUA 216 provides an address of the stream provider 300 and the query S1 to the DSR 222 by analyzing an SSDL file described in the SUAL file. The DSR 222 is connected to the stream provider 300 using the address, and provides the query to the connected stream provider 300.

The SUA 216 sends the signal S3 to the SUIM 236, causes the SUIM 236 to create the SUI, and informs the SUIM 236 of an execution mode of a service.

The SO module 230 may process the user request when SUIM 236 completes an execution preparation of the SU.

The SH module 220 updates in real time the DS provided from the stream provider 300 as the query result in the buffer.

The URH 232 receives the user request and transmits the user request to the scheduler 234. In addition, the scheduler 234 assigns the user request to the SUIM 236 to be processed by selecting the user request. The SUIM 236 makes the SUI execute based on the data stored in the buffer and transmits the executed data to the URH 232. The URH 232 transmits the executed data to the user 100.

As mentioned above, a service developer may develop a stream-based service without modification of a program at an existing static data-based SL using the indicated service model. In addition, service development may be conveniently performed and the period of the service development may be reduced because the service developer may not need to program a complicated stream connection and a processing part when the service developer develops a new stream-based service.

In addition to the efficient service development, the service provider may provide the service by easily configuring a service environment because a middleware runtime environment taking charge of efficient stream processing and of service instance management supports efficient deployment and operation of the developed service.

As mentioned above, various users may obtain more efficient types of information and knowledge by activating development and provision of a data stream-based service, which is practical for ubiquitous environments, based on the middleware system development supporting a service development step, a deployment step, and a provision step.

While the example embodiments of the present invention and their advantages have been described in detail, it should be understood that various changes, substitutions and alterations may be made herein without departing from the scope of the invention.

What is claimed is:

1. A method of processing a data stream(DS), comprising:
    selecting a Stream Source Description Language (SSDL) file and a Service Unit (SU), the SSDL file and the SU being assigned by a Service Unit Activation Language (SUAL) file;
    transmitting a query written by the selected SUAL file to a corresponding stream provider based on a stream provider address written by selected SSDL file;
    preparing a buffer based on a schema information about a result of the transmitted query;
    generating an instance of the selected SU;
    intializing the selected SU into an execution mode assigned by the SUAL file;
    updating, in real time, data stored in the prepared buffer by using the DS provided by the stream provider; and
    processing the data stored in the buffer according to the execution mode in response to a user request to provide a result of the user request to a user by a service operator (SO) module,
    wherein the SUAL file comprises the SSDL file, the SU, the query and the execution mode,
    the execution mode comprises a push mode and a pull mode,
    one instance of the selected SU per user request is generated and preserved during a requested time duration in the push mode, and
    a predetermined number of the instances of the selected SU is generated and managed in an instance pool in the pull mode,
    wherein the SO module comprises:
    a user request handler (URH) that registers the user request and transmits the result of the user request to the user;
    a scheduler that controls a processing schedule of the user request registered in the URH in response to a resource usage state;
    a service unit instance manager (SUIM) that processes the user request by executing the SUI by processing the SUI in response to the processing schedule from the scheduler according to the execution mode and provides the result of the user request to the URH; and
    a runtime moniter (RM) that monitors the resource usage state of each component and the SUI that is currently being executed, and provides the resource usage state to the scheduler, wherein the SUIM generates one SUI per user request and the generated SUI becomes extinct after a requested time duration when the execution mode corresponds to the push mode.

2. The method of claim 1, wherein the SU comprises a service logic (SL) and a Service Unit Description Language (SUDL) file, the SL and SUDL file being developed by a service developer.

3. The method of claim 2, wherein the SL comprises an initialization function, a process function, an uninitialization function, a buffer semantic function, and a tuple handler function.

4. The method of claim 2, wherein the SUDL file comprises a service name, an input data schema, an output data schema, and a transmission element.

5. The method of claim 1, wherein the buffer comprises a first buffer for buffering recent N pieces of data, a second buffer for buffering one piece of data per data key, and a third buffer for buffering recent N pieces of data per data key.

6. The method of claim 1, wherein the requested data is updated in real time and is repeatedly provided to the user when the execution mode corresponds to the push mode.

7. The method of claim 1, wherein the requested data is provided only by the user when the execution mode corresponds to pull mode.

8. The method of claim 1, wherein the SSDL file comprises a service name, a location and a DS schema.

9. A computer middleware system of processing a data stream (DS) and transmitting the DS from a stream provider to a user terminal, comprising;
a memory;
a service deployer (SD) module configured to register a Service Unit (SU) developed by a serviced developer and an Serviced Unit Activation Language (SUAL) file written by a service provider, and configured to generate a query, a query result schema and execution mode information, the query result schema and the execution mode information being assigned by the registered SUAL file;
a stream handler (SH) module configured to transmit the query from the SD module to the stream provider and configured to update, in real time, data stored in a buffer in response to the query result schema by using the DS provided by the stream provider; and
a service operator (SO) module configured to receive a user request, configured to process the data stored in the buffer by executing a service unit instance (SUI) in response to the user request according to the execution mode information from the SD module, and configured to provide a result of the user request to the user,
wherein the SUAL file comprises a Service Source Description Language (SSDL) file, the SU, the query and the execution mode,
the execution mode comprises a push mode and a pull mode,
one SUI per user request is generated and preserved during a requested time duration in the push mode, and
a predetermined number of the SUIs is generated and managed in an instance pool in the pull mode,
wherein the SO module comprises;
a user request handler (URH) that registers the user request and transmits the result of the user request to the user;
a scheduler that controls a processing schedule of the user request registered in the URH in response to a resource usage state;
a service unit instance manager (SUIM) that processes the user request by executing the SUI by processing the SUI in response to the processing schedule from the scheduler according to the execution mode and provides the result of the user request to the URH; and
a runtime monitor (RM) that monitors the resource usage state of each component and the SUI that is currently being executed, and provides the resource usage state to the scheduler,
wherein the SUIM generates one SUI per user request and the generated SUI becomes extinct after a requested time duration when the execution mode corresponds to the push mode.

10. The computer middleware system of claim 9, wherein the SD module comprises:
a service unit registry (SUR) that stores the SU;
a service unit handler (SUH) that performs registration of the SU on the SUR and processes the SUAL file written by the service provider; and
a service unit activator (SUA) that generates the query, the query result schema, and the execution mode information, the SUAL file being provided by the SUH.

11. The computer middleware system of claim 10, wherein the SUA manages a query list, merges an input query into an existing query when the result of the input query and the result of the existing query are identical to each other, and provides a new query to the stream provider requesting a partial result of the input query when result of the input query and the result of the existing query are partially overlapped.

12. The computer middleware system of claim 9, wherein the SH module comprises:
a data stream receiver (DSR) that transmits the query from the SD module the stream provider and receives the DS from the stream provider in response to the query; and a buffer manager (BM) that assigns a buffer in memory in the response to the query result schema provided by the SD module, assigns the buffer to the corresponding query, stores data in the assigned buffer using the DS provided by the DSR, and provides the data to the SO module according to an execution mode.

13. The computer middleware system of claim 12, wherein the BM converts the DS to data conforming to an input data schema of a service logic (SL) and provides the converted data to the SO module.

14. The computer middleware system of claim 9, wherein the SUIM selects one SUI out of an instance pool to process the user request and returns the selected SUI into the instance pool when the execution mode corresponds to the pull mode.

15. A computer-readable storage medium storing a program that performs a method of processing a data stream (DS), the method comprising:
selecting an Stream Source Description Language (SSDL) file and a Service Unit (SU), the SSDL file and the SU being assigned by an Service Unit Activation Language (SUAL) file;
transmitting a query written by the selected SUAL file to a corresponding stream provider based on a stream provider address written by the selected SSDL file;
preparing a buffer according to schema information about a result of the transmitted query;
generating an instance of the selected SU;
initializing the selected SU into an execution mode assigned by the SUAL file;
updating, in real time, data stored in the prepared buffer by using the DS provided by the stream provider; and
processing the data stored in the buffer based on the execution mode in response to a user request to provide a result of the user request to a user by a service operator (SO) module, wherein the SUAL file comprises a Service Source Description Language (SDDL) file, the SU, the query and the execution mode, the execution mode comprises a push mode and a pull mode, one instance of the selected SU per user request is generated and preserved during a requested time duration in the push mode, and a predetermined number of the instances of the selected SU is generated and managed in an instance pool in the pull mode, wherein the SO module comprises;

a user request handler (URH) that registers the user request and transmits the result of the user request to the user;

a scheduler that controls a processing schedule of the user request registered in the URH in response to a resource usage state;

a service unit instance manager (SUIM) that processes the user request by executing the SUI by processing the SUI in response to the processing schedule from the scheduler according to the execution mode and provides the result of the user request to the URH; and a runtime monitor (RM) that monitors the resource usage state of each component and the SUI that is currently being executed, and provides the resource usage state to the scheduler, wherein the SUIM generates one SUI per user request and the generated SUI becomes extinct after a requested time duration when the execution mode corresponds to the push mode.

* * * * *